Figure 1:
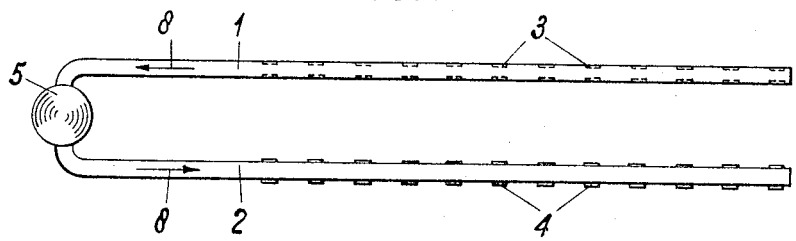

Sept. 13, 1966  A. W. VAN GILS  3,271,959
DEVICE FOR UTILIZING THE ENERGY PRESENT IN
ROLLING WAVES OF WATER
Filed Jan. 14, 1965  2 Sheets-Sheet 1

Inventor
A. W. VAN GILS
By Joshf-Ostruff atty

Sept. 13, 1966 A. W. VAN GILS 3,271,959
DEVICE FOR UTILIZING THE ENERGY PRESENT IN
ROLLING WAVES OF WATER
Filed Jan. 14, 1965 2 Sheets-Sheet 2

Inventor
A. W. van Gils
By Joshof-Oshuff, atty

3,271,959
DEVICE FOR UTILIZING THE ENERGY PRESENT IN ROLLING WAVES OF WATER
Adrianus W. van Gils, Seria, Brunei, British Borneo
Filed Jan. 14, 1965, Ser. No. 425,485
4 Claims. (Cl. 60—55)

The invention aims at providing a device for utilizing the energy present in the rolling waves of water, especially seawaves rolling to the shore.

The invention is based on the idea that there is a higher static pressure under a wave top than under a wave trough. In order to utilize this difference in static pressure-height a device according to the invention is provided with two tubes intended to be placed in the water, one of these tubes being provided with valves or the like opening inwardly and the other with valves or the like opening outwardly, said tubes being connected to a water turbine or water motor. The remainder of the tubes are closed.

When somewhere above the tube with inlet valves a wave top is present one or more of these inlet valves will open because of the height of the wave and water will stream into this tube. At the same time, there will be a wave trough somewhere above the tube with outlet valves under which wave through one or more outlet valves will open under the influence of the water penetrating into the first mentioned tube. As the tubes are only connected by a water turbine or the like the passing water will cause this turbine to rotate.

It will be clear that when a wave top is present above the outlet valves, they will be closed and that a wave trough will not open inlet valves.

If, according to the invention, the tubes with valves lie more or less in the direction of the course of the waves the wave-tops and -troughs will move over the tubes in longitudinal direction thereof. Then all inlet and outlet valves will be opened one after the other and a constant flow of water through the turbine will be the result.

It is also possible, according to the invention, that the tubes with valves lie more or less parallel to the waves. It is then preferable to equal their mutual distance to the distance between a wave trough and a wave top. If a wave top comes above a tube with inlet valves water will flow simultaneously through all these valves which will then open all outlet valves which are then present under a wave trough. The action of the device is then stronger than in the first described case but not so consistent. This consistency may be stimulated by placing between the tube with inlet valves and the turbine a tank by which gush-like inflows of water are transformed into a more even flowing-off to the turbine.

If the water has not only a wave-motion but also a current this current will help the water to flow through the device. Under favourable conditions this current alone may be sufficient to rotate the turbine. This may be the case in the vicinity of a pier, a breakwater or a jetty.

The invention will now be elucidated by the aid of the drawing showing some embodiments sketchily.

Figure 2:
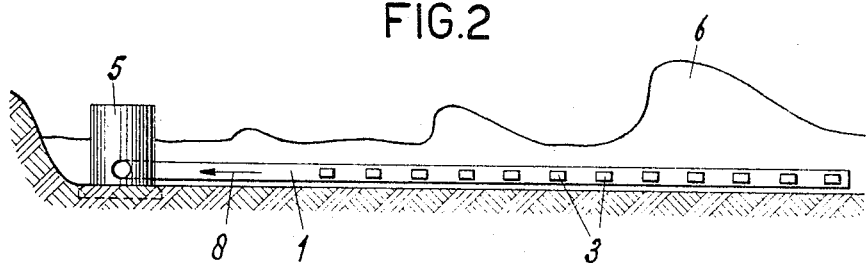
Figure 3:
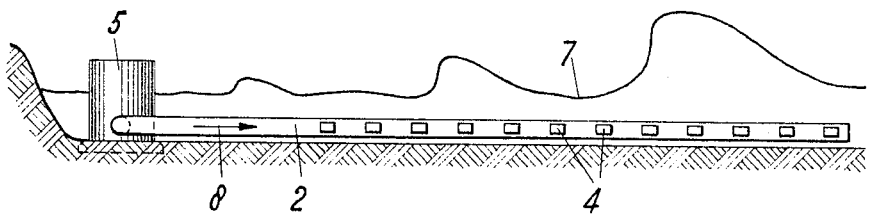
Figure 4:
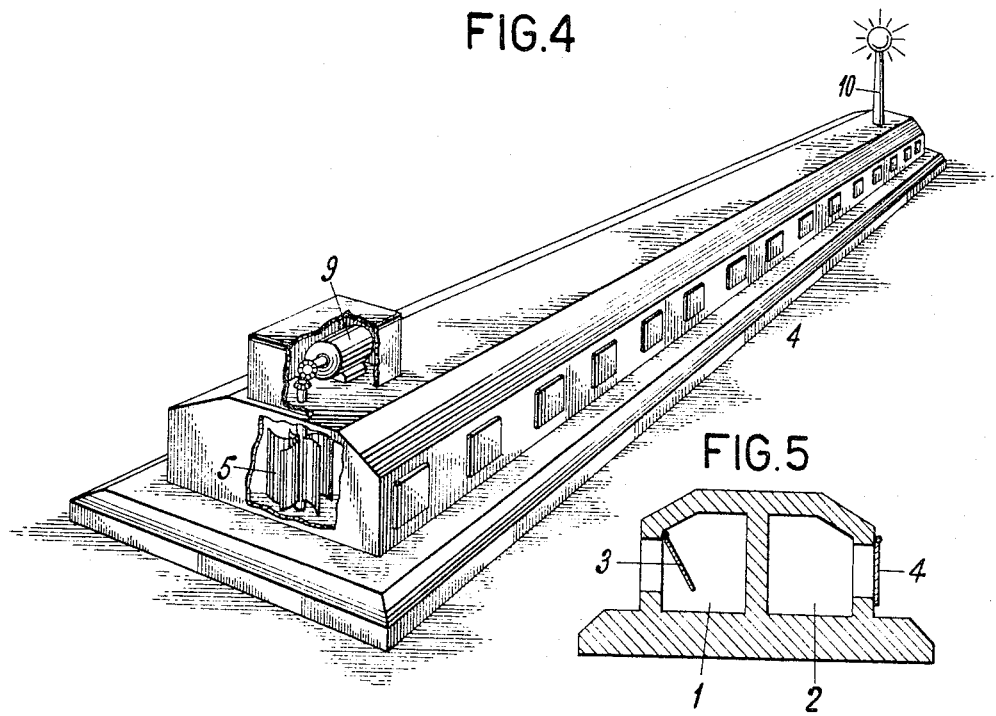
Figure 5:
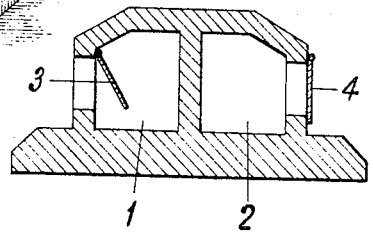
Figure 6:
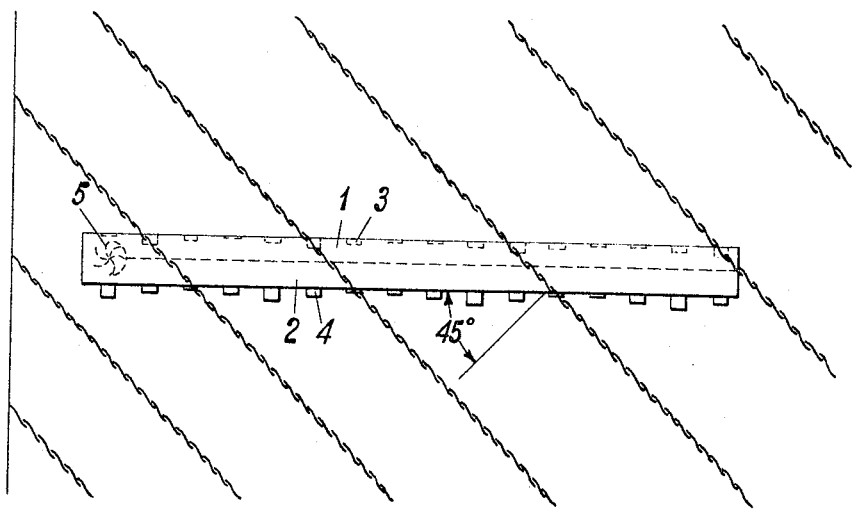

FIG. 1 is a top view of the first embodiment.
FIG. 2 is a vertical section over the inlet tube thereof.
FIG. 3 is a vertical section over the outlet tube thereof.
FIG. 4 is a sketch of a second embodiment.
FIG. 5 is a cross-section of this embodiment.
FIG. 6 is a top view of this embodiment.

In FIG. 1 the land is lying to the left and the waving water to the right. The device has two tubes 1 and 2 running parallel to each other and connected to each other. These tubes 1 and 2 have valves, i.e. the tube 1 has valves 3 opening inwardly and tube 2 has valves 4 which can only discharge outwardly. The ends of the tubes running to the shore are connected to a water turbine 5 in a housing.

FIG. 2 is a vertical cross-section over the inlet tube 1 and FIG. 3 a vertical cross-section over the outlet tube 2. In both figures the wave conditions of the water at a certain moment has been shown.

A wave 6 will open the underlying inlet valves 3 in the tube 1 and the water flowing thereby into the tube can only via the turbine 5 and the tube 2 flow out by outlet valves 4 lying at that moment underneath a trough 7. For in this situation the inlet valves 3 which are then lying underneath a wave trough are kept closed by the pressure of water in the tubes whilst the outlet valves 4 which are at that moment lying underneath a wave cannot open.

As the waves roll towards the shore they will open subsequent inlet valves 3 and other outlet valves 4 will always open which are lying underneath the running wave troughs. By this a flow of water will occur in the tubes running in the direction of the arrows 8 in FIGS. 1, 2 and 3. This flow of water will cause the turbine or water motor in the housing 5 to rotate. This rotation can be utilized e.g. for driving an electric dynamo. It appears that the removal of water from a wave does not influence its height.

It may be stated that it is not necessary for the ends of the tubes to be connected to the turbine. It is, e.g. also possible to mkae the connection to the turbine halfway up the length of the tubes 1 and 2. It is also possible to connect the end of one tube directly to the turbine and to place the other tube with valves in the continuation of the first mentioned tube and to connect the tube laying far away by a tube without valves to the turbine.

In FIG. 4 an embodiment is shown in perspective of a device according to the invention which is at the same time an underwater breakwater and/or flow conduit. FIG. 5 is a vertical cross-section thereof.

The entire device is made of concrete and has two canals 1 and 2 lying in lengthwise direction of the device. Furthermore there are inlet valves 3 and outlet valves 4. These valves may also partly be placed in the upper surface. The turbine indicated by 5 drives a dynamo 9, the electric current of which is used for lighting a danger light 10 at the end of the break water.

It is not necessary for the tubes to lie exactly in the direction of movement of the waves. In case of an angle of 45° the device will operate as well. This appears on viewing FIG. 6 showing a schematic horizontal cross section.

What I claim is:

1. A device to be placed in a body of water in the vicinity of rolling waves of the water to utilize the energy of the rolling waves comprising a water turbine or motor, an inlet tube for directing water to the turbine or motor for driving the same and an outlet tube for directing water from the trubine, the inlet tube having a plurality of inlet valves only permitting entry of the water from the body of water into the inlet tube and the outlet tube having a plurality of valves only permitting the exit of the water from the outlet tube into the body of water, both of said tubes being positioned in substantially the same plane, so that when the crest of a wave passes over a valve in the inlet tube the greater hydrostatic presure will permit the water to enter the inlet tube and so that when a trough of a wave passes over a valve in the outlet tube the lower hydrostatic pressure will permit the water to flow out of the outlet tube whereby the turbine or motor is driven by a difference in the hydrostatic pressure between the crests and troughs of the waves.

2. A device according to claim 1, in which the tubes extend at an angle to the waves.

3. A device according to claim 1, wherein the tubes are substantially, perpendicular to the waves.

4. A device according to claim 1 wherein the device is positioned as, and acts as, a breakwater near the shore.

References Cited by the Examiner
UNITED STATES PATENTS 875,042 12/1907 Bissell _____ 60—57

FOREIGN PATENTS 1,232,133 4/1960 France.
219,323 1/1925 Great Britain.

EDGAR W. GEOGHEGAN, Primary Examiner.